United States Patent
Lee et al.

(10) Patent No.: US 9,122,104 B2
(45) Date of Patent: Sep. 1, 2015

(54) DISPLAY APPARATUS AND METHOD OF MANUFACTURING THE SAME

(71) Applicant: SAMSUNG DISPLAY CO., LTD., Yongin, Gyeonggi-do (KR)

(72) Inventors: Junheui Lee, Seoul (KR); Seon Uk Lee, Gyeonggi-do (KR); Dong Hwan Kim, Gyeonggi-do (KR); Haeju Yun, Gyeonggi-do (KR); Hee-Keun Lee, Gyeonggi-do (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 65 days.

(21) Appl. No.: 14/051,041

(22) Filed: Oct. 10, 2013

(65) Prior Publication Data

US 2014/0333884 A1    Nov. 13, 2014

(30) Foreign Application Priority Data

May 7, 2013 (KR) .................. 10-2013-0051338

(51) Int. Cl.
*G02F 1/1341* (2006.01)
*G02F 1/1339* (2006.01)

(52) U.S. Cl.
CPC ............ *G02F 1/1339* (2013.01); *G02F 1/1341* (2013.01)

(58) Field of Classification Search
CPC .............. G02F 1/1303; G02F 1/1333; G02F 1/133377; G02F 1/1341; G02F 1/13; G02F 1/1339; G01F 23/02

USPC ............. 349/153, 122, 42, 96, 187, 189, 190, 349/138

See application file for complete search history.

(56) References Cited

U.S. PATENT DOCUMENTS

| | | | |
|---|---|---|---|
| 7,795,800 B2 | 9/2010 | Lee et al. | |
| 2003/0122763 A1 | 7/2003 | Moon | |
| 2012/0092599 A1 | 4/2012 | Lee et al. | |
| 2014/0055440 A1* | 2/2014 | Cho et al. | 345/212 |
| 2014/0055721 A1* | 2/2014 | Choi et al. | 349/96 |

FOREIGN PATENT DOCUMENTS

| | | |
|---|---|---|
| JP | 2011-112759 | 9/2011 |
| KR | 10-2006-0076935 | 5/2006 |
| KR | 10-2008-0024337 | 3/2008 |
| KR | 10-2008-0105262 | 4/2008 |
| KR | 10-2008-0058912 | 6/2008 |
| KR | 10-2014-0025739 | 3/2014 |

* cited by examiner

*Primary Examiner* — Thoi Duong
(74) *Attorney, Agent, or Firm* — Knobbe, Martens, Olson & Bear LLP

(57) ABSTRACT

A display apparatus and a method of manufacturing a display apparatus are disclosed. A display may include a base substrate, a plurality of pixel rows each of which includes a plurality of pixels arranged both in a first direction and in a second direction, a sealant layer covering the pixel rows, and a trench disposed between the pixel rows. Each pixel row may include a plurality of active cavities arranged along the trench and a drain cavity disposed on at least one end of the trench. A capillary force decreases along the active cavities, the drain cavity, and the trench.

20 Claims, 14 Drawing Sheets

Perimeter of Cross-Section=2a+2b
Area of Cross-Section=ab

Perimeter of Cross-Section=6a+2b
Area of Cross-Section=3ab

Perimeter of Cross-Section=2a+2b
Area of Cross-Section=ab

Perimeter of Cross-Section=2a+2c
Area of Cross-Section=ac

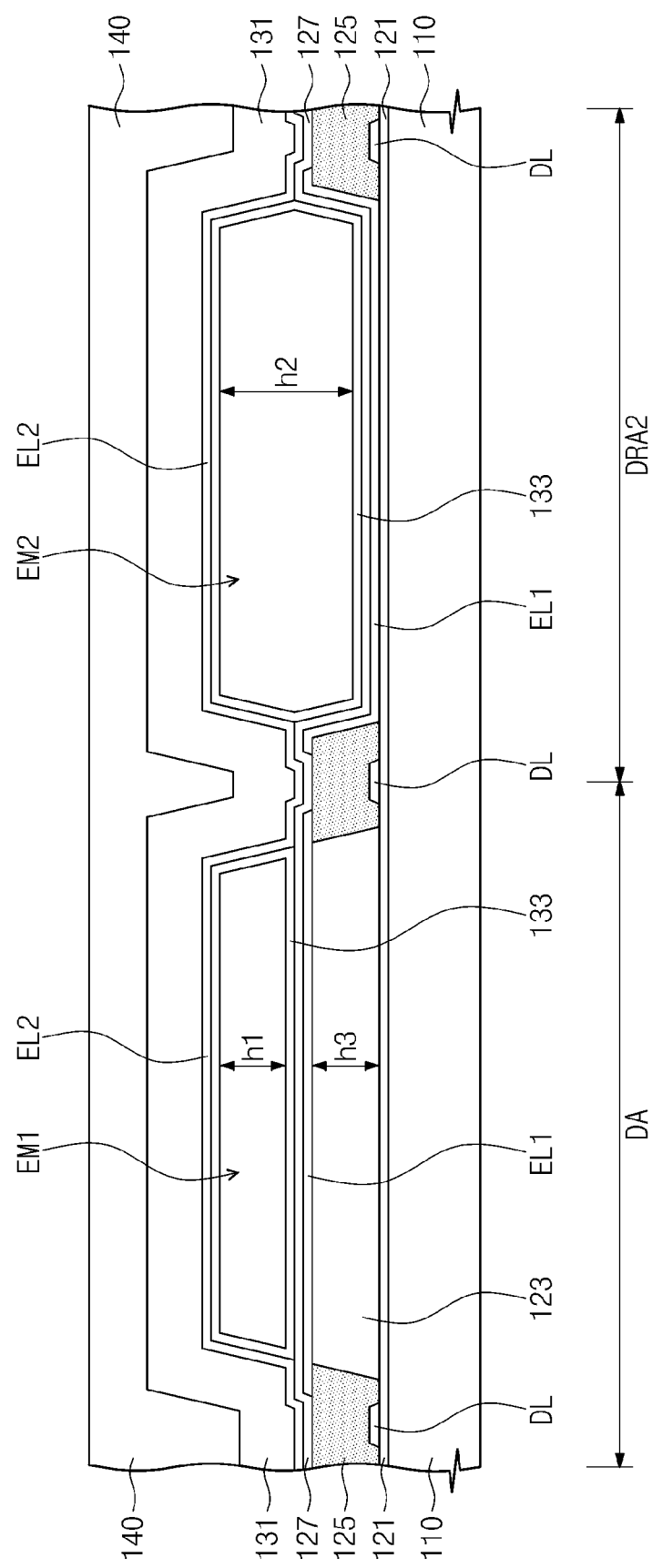

DISPLAY APPARATUS AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2013-0051338, filed on May 7, 2013, the contents of which are hereby incorporated by reference in its entirety.

BACKGROUND

1. Field

The present disclosure relates to a display apparatus and a method of manufacturing the same. More particularly, the present disclosure relates to a display apparatus capable of securing a margin in liquid crystal-carrying capacity and a method of manufacturing the display apparatus.

2. Description of the Related Technology

In recent years, various flat panel display apparatuses, for example, a liquid crystal display, an electrophoretic display, etc., have been widely used instead of a cathode ray tube. The flat panel display apparatus includes two substrates facing each other and an image display layer interposed between the two substrates, such as a liquid crystal layer, an electrophoretic layer, etc. The two substrates face each other and are spaced apart from each other at a predetermined distance while being coupled to each other such that the image display layer is disposed between the two substrates. To manufacture the flat panel display apparatus, a spacer is formed on one of the two substrates to maintain the distance between the two substrates, and then the spacer is bonded to the other of the two substrates. As a result, manufacturing process of the flat panel display apparatus are complicated and manufacturing cost of the flat panel display apparatus is increased.

SUMMARY OF CERTAIN INVENTIVE ASPECTS

In one aspect, a display apparatus capable of securing a margin in liquid crystal-carrying capacity is provided.

In another aspect, a method of manufacturing a display apparatus is provided.

In another aspect, a display apparatus includes, for example, a base substrate, a plurality of pixel rows each of which includes a plurality of pixels arranged in a first direction and is arranged in a second direction, and a sealant layer that covers the pixel rows and a trench disposed between the pixel rows.

In some embodiments, each pixel row includes a plurality of active cavities arranged along the trench and a drain cavity formed on at least one end of the trench. In some embodiments, a capillary force decreases from the active cavities, the drain cavity, and the trench.

In another aspect, a method of manufacturing a display apparatus includes, for example, forming a sacrificial layer on a base substrate in a unit of pixel, forming a cover layer on the sacrificial layer in every pixel row, etching the sacrificial layer to form an active cavity and a drain cavity, providing a liquid crystal to a trench between the cover layer and an adjacent cover layer, moving the liquid crystal into the active cavity and the drain cavity using a capillary force to form a liquid crystal layer in the active cavity and the drain cavity, and forming a sealant layer to seal inlets of the active cavity and the drain cavity.

In some embodiments, the capillary force decreases from the active cavity, the drain cavity, and the trench, and the liquid crystal in the trench moves to the drain cavity after being filled in the active cavity by a capillary force difference.

In some embodiments, the drain cavity is formed at the end portion of the pixel row to absorb the liquid crystal that remains in the trench. In some embodiments, the margin of the liquid crystal-carrying capacity may be secured, and the liquid crystal may be prevented being perceived as stains.

BRIEF DESCRIPTION OF THE DRAWINGS

The above and other advantages of the present disclosure will become readily apparent by reference to the following detailed description when considered in conjunction with the accompanying drawings wherein:

FIG. 8 is a cross-sectional view showing a drain cavity according to an exemplary embodiment of the present disclosure;

DETAILED DESCRIPTION OF CERTAIN INVENTIVE EMBODIMENTS

Figure 1:
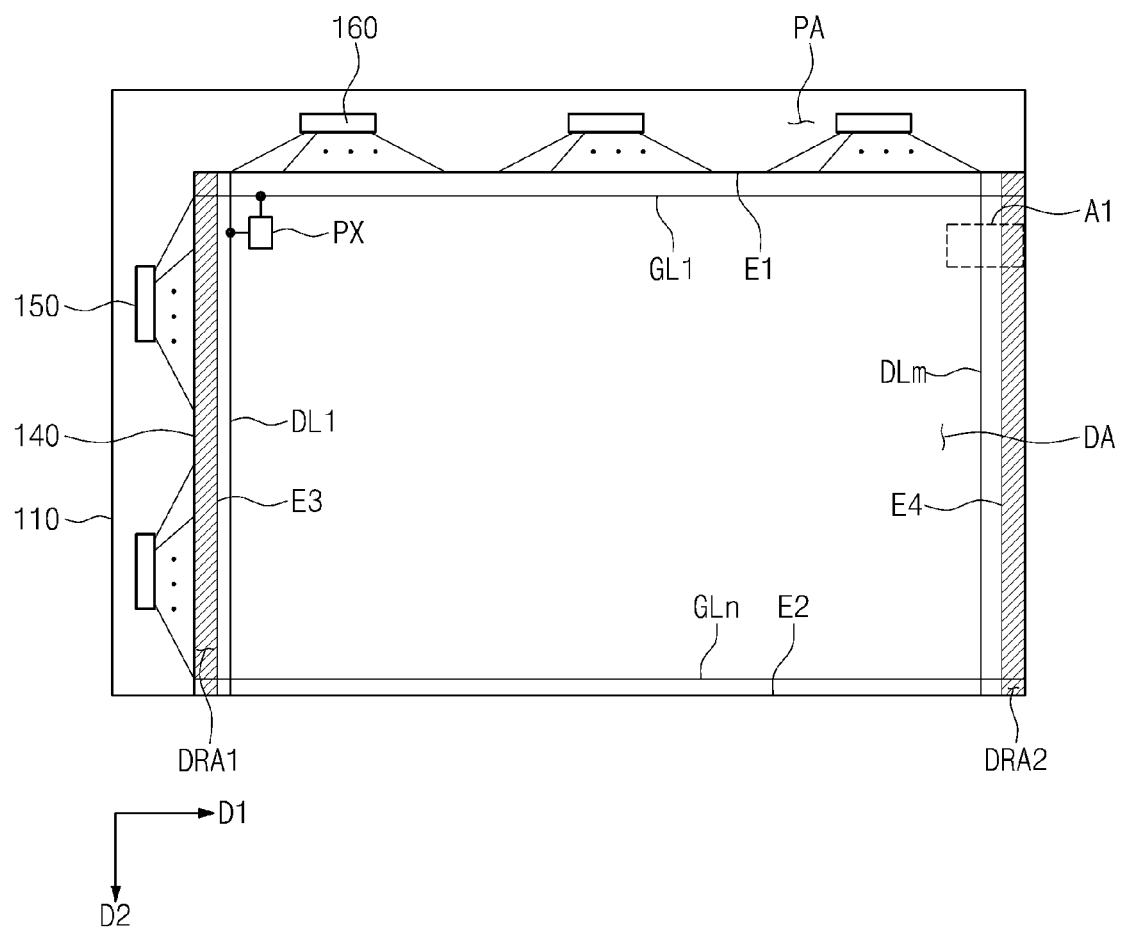
FIG. 1 is a plan view showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments will be explained in detail with reference to the accompanying drawings.

FIG. 1 is a plan view showing a display apparatus 100 according to an exemplary embodiment of the present disclosure. Referring to FIG. 1, the display apparatus 100 includes a base substrate 110 and a plurality of pixels PX disposed on the base substrate 110. The base substrate 110 is a transparent or non-transparent insulating substrate, for example, a silicon substrate, a glass substrate, or a plastic substrate. The base substrate 110 includes a display area DA, a peripheral area PA, and first and second drain areas DRA1 and DRA2. The display area DA includes the pixels PX to display an image. The display area DA has a rectangular shape and includes two sides substantially in parallel to a first direction D1 and two sides substantially in parallel to a second direction D2 substantially perpendicular to the first direction D1. In the present exemplary embodiment, the two sides parallel to the first direction D1 are referred to as first and second long sides E1 and E2 and the two sides parallel to the second direction D2 are referred to as first and second short sides E3 and E4.

The first and second drain areas DRA1 and DRA2 are disposed adjacent to both sides of the display area DA. As an example, the first drain area DRA1 is disposed adjacent to the first short side E3 of the display area DA and the second drain area DRA2 is disposed adjacent to the second short side E4 of the display area DA.

The peripheral area PA is disposed adjacent to the first long side E1 and the first drain area DRA1, but it should not be limited thereto or thereby. That is, the peripheral area PA may be disposed to at least one side of the display area DA or to one of the first and second drain areas DRA1 and DRA2.

The pixels PX are arranged on the display area DA of the base substrate 110 in a matrix form defined by rows by columns. A plurality of gate lines GL1 to GLn that applies gate signals to the pixels PX and a plurality of data lines DL1 to DLm that applies data signals to the pixels PX are disposed on the base substrate 110.

The gate lines GL1 to GLn are extended in the first direction D1 on the display area DA and arranged in the second direction D2 to be spaced apart from each other. The data lines DL1 to DLm are extended in the second direction D2 on the display area DA and arranged in the first direction D1 to be spaced apart from each other.

One ends of the gate lines GL1 to GLn are extended to the peripheral area PA after passing through the first drain area DRA1 and one ends of the data lines DL1 to DLm are extended to the peripheral area PA.

The display panel 100 further includes a gate driver 150 to apply the gate signals to the gate lines GL1 to GLn and a data driver 160 to apply the data signals to the data lines DL1 to DLm. As an example, the gate driver 150 is configured to include a plurality of driver chips and mounted on the peripheral area PA of the base substrate 110. In addition, the data driver 160 is configured to include a plurality of driver chips and mounted on the peripheral area PA of the base substrate 110.

As another example, the driver chips may be mounted on a film electrically connected to the base substrate 110. The gate driver 150 may be directly formed on the base substrate 110 rather than the shape of the driver chip.

Figure 2:
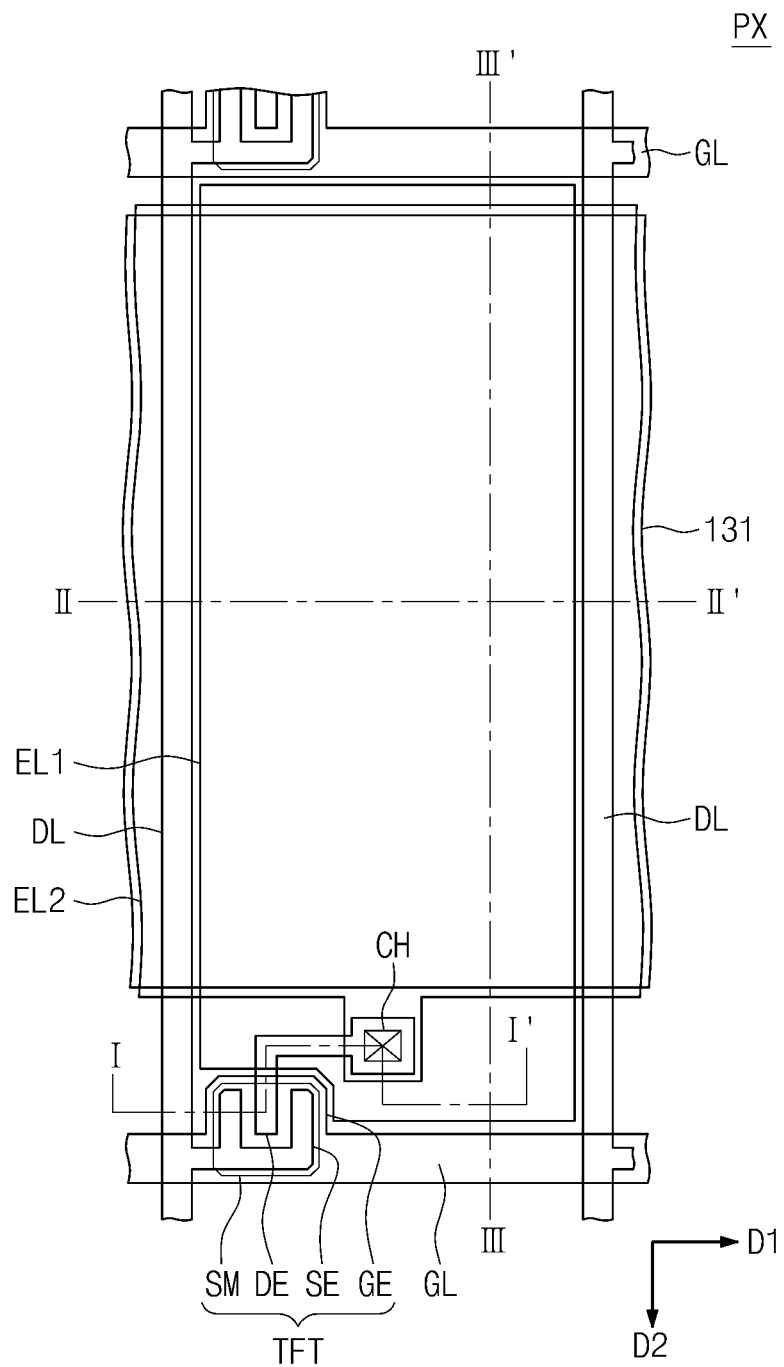
FIG. 2 is a plan view showing a pixel of FIG. 1.
Figure 3A:
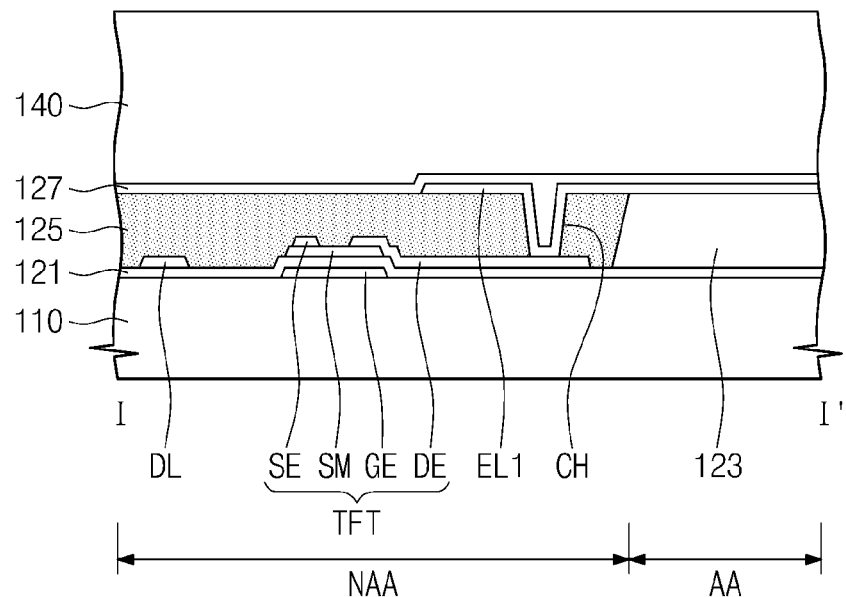
FIG. 3A is a cross-sectional view taken along a line I-I' of FIG. 2.
Figure 3B:
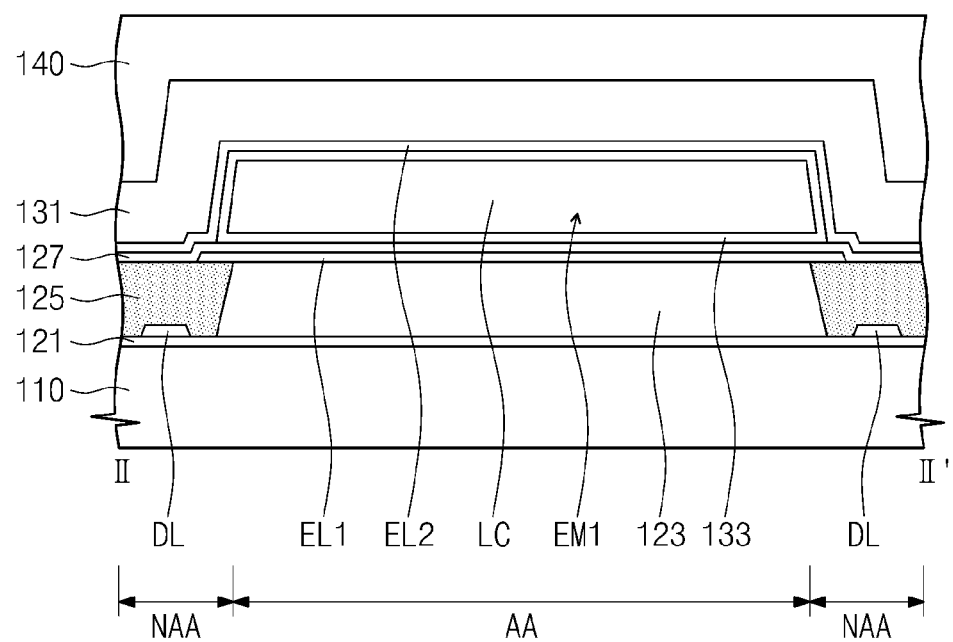
FIG. 3B is a cross-sectional view taken along a line II-II' of FIG. 2.
Figure 3C:
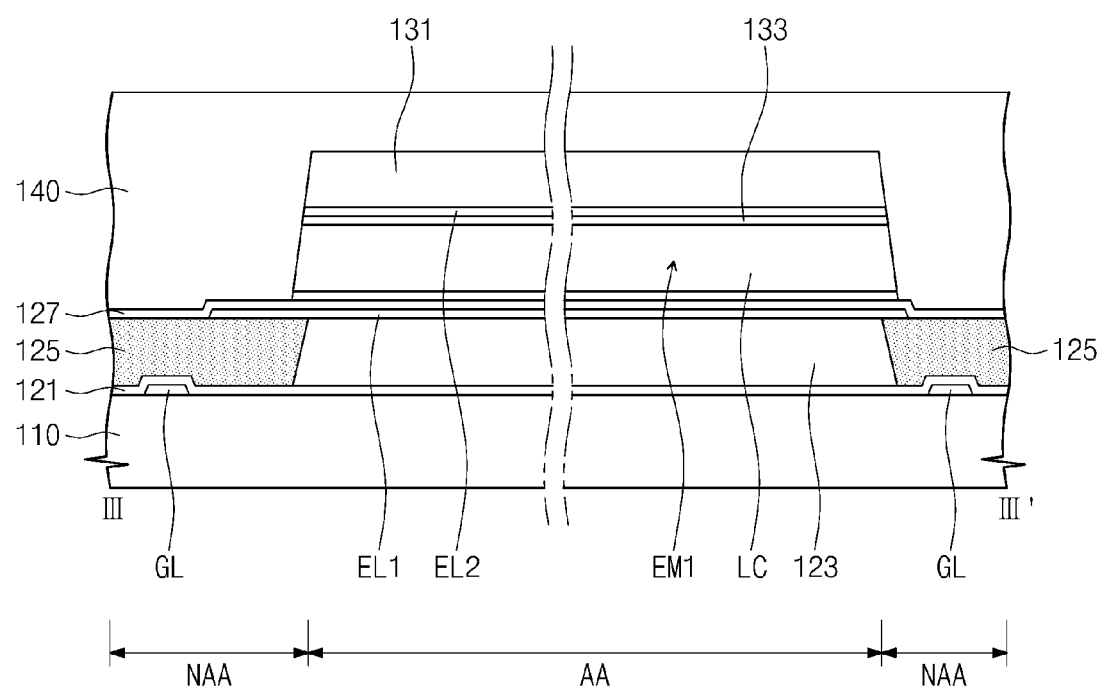
FIG. 3C is a cross-sectional view taken along a line III-III' of FIG. 2.

FIG. 2 is a plan view showing a pixel of FIG. 1. FIG. 3A is a cross-sectional view taken along a line I-I' of FIG. 2. FIG. 3B is a cross-sectional view taken along a line II-II' of FIG. 2. FIG. 3C is a cross-sectional view taken along a line of FIG. 2. In the present exemplary embodiment, the pixels PX have the same structure and function, and thus, for the convenience of explanation, only one pixel PX has been shown in FIG. 2. The pixel PX in this embodiment has a rectangular shape elongated in one direction, but it should not be limited to the rectangular shape. For instance, the pixel PX may have various shapes, for example, a V-shape, a Z-shape, etc., when viewed in a plan view. Referring to FIGS. 2 and 3A to 3C, the pixel PX is disposed in a pixel area defined by two gate lines GL and two data lines DL. The pixel PX includes a thin film transistor TFT, first and second electrodes EL1 and EL2, an active cavity EM1, and a liquid crystal layer LC.

The thin film transistor TFT is connected to the gate line GL and the data line DL and includes a gate electrode GE, a semiconductor SM, a source electrode SE, and a drain electrode DE. The gate electrode GE is protruded from the gate line GL and provided on a portion of the gate line GL. The gate line GL and the gate electrode GE may be formed of a metal material, for example, nickel, chromium, molybdenum, aluminum, titanium, copper, tungsten, or an alloy thereof. The gate line GL and the gate electrode GE have a single-layer structure or a multi-layer structure. For instance, the gate line GL and the gate electrode GE have a triple-layer structure of molybdenum-aluminum-molybdenum, which are sequentially stacked, a double-layer structure of titanium and copper, which are sequentially stacked, or a single-layer structure of an alloy of titanium and copper.

A first insulating layer 121 is disposed over an entire surface of the base substrate 110 to cover the gate line GL and the gate electrode GE. The semiconductor layer SM is disposed on the gate electrode GE while interposing the first insulating layer 121 therebetween. The source electrode SE is branched from the data line DL and overlapped with the semiconductor layer SM. The drain electrode DE is spaced apart from the source electrode SE on the semiconductor layer SM. Here, the semiconductor layer SM forms a conductive channel between the source electrode SE and the drain electrode DE.

Each of the source electrode SE and the drain electrode DE is formed of a conductive material, for example, a metal material. Each of the source electrode SE and the drain electrode DE may be formed of a single metal material, but it should not be limited thereto or thereby. For instance, each of the source electrode SE and the drain electrode DE may include two or more metal materials or two or more metal alloys. The metal material includes nickel, chromium, molybdenum, aluminum, titanium, copper, tungsten, and alloys thereof. In this embodiment, each of the source electrode SE and the drain electrode DE has a single-layer structure or a multi-layer structure. For instance, each of the source electrode SE and the drain electrode DE may have a double-layer structure of titanium and copper.

A color filter 123 is disposed on the first insulating layer 121. The color filter 123 is provided in an effective area AA of the pixel area, which is used to display the image. The color filter 123 may be a red color filter, a green color filter, or a blue color filter and disposed to correspond to each pixel area. The color filter 123 may further include a different color, for example, a white color filter.

A black matrix 125 is further disposed on the first insulating layer 121. The black matrix 125 is disposed in a non-effective area NAA of the pixel area to block a light unnecessary to display the image. The black matrix 125 prevents a light from leaking and colors from mixing.

The black matrix 125 is provided with a contact hole CH formed therethrough to expose a portion of the drain electrode DE of the thin film transistor TFT. In the present exemplary embodiment, the contact hole CH is formed by removing a portion of the black matrix 125, but it should not be limited thereto or thereby. According to another exemplary embodiment, the contact hole CH may be formed by partially removing the color filter 123.

The first electrode EL1 is disposed on the color filter 123 and the black matrix 125. The first electrode EL1 is electrically connected to the drain electrode DE of the thin film transistor TFT through the contact hole CH of the black matrix 125. A second insulating layer 127 is disposed on the first electrode EL1 to protect the first electrode EL1, however the second insulating layer 127 may be omitted. The second insulating layer 127 is formed of an inorganic insulating material or an organic insulating material.

A cover layer 131 that defines an active cavity EM1, a liquid crystal layer LC in the active cavity EM1, an alignment layer 133 that aligns liquid crystal molecules of the liquid crystal layer LC, and the second electrode EL2 that controls the liquid crystal layer LC in cooperation with the first electrode EL1 are disposed on the second insulating layer 127.

The cover layer 131 is extended in a first direction D1 on the second insulating layer 127. The cover layer 131 is spaced apart from an upper surface of the second insulating layer 127 to define the active cavity EM1 together with the second insulating layer 127. In other words, the cover layer 131 is upwardly spaced apart from the upper surface of the second insulating layer 127 to form a predetermined space between the cover layer 131 and the second insulating layer 127, and the predetermined space is defined as the active cavity EM1. The active cavity EM1 is formed to correspond to the effective area AA and has a tunnel shape.

Meanwhile, the active cavity EM1 is not formed in the non-effective area NAA. That is, the cover layer 131 contacts the second insulating layer 127 in the non-effective area NAA, and thus, any spaced is not formed between the cover layer 131 and the second insulating layer 127.

The active cavity EM1 has a shape extended in the second direction D2 and both end portions of the active cavity EM1 are opened without being covered by the cover layer 131. Since the liquid crystal is injected through the opened portions of the active cavity EM1, the opened portions are referred to as inlets. The cover layer 131 may be extended in a direction different from the second direction D2.

The cover layer 131 may include an organic or inorganic insulating layer. The cover layer 131 has a single-layer structure in the present exemplary embodiment, but it should not be limited to the single-layer structure. The cover layer 131 may have a multi-layer structure, for example, a triple-layer structure of inorganic insulating layer-organic insulating layer-inorganic insulating layer, which are sequentially stacked.

The second electrode EL2 is provided along a lower surface of the cover layer 131 and forms an electric field in cooperation with the first electrode EL1. The second electrode EL2 is extended in the first direction D1, and thus, the second electrode EL2 is shared by the pixels PX arranged in the second direction D1.

In this embodiment, the second electrode EL2 is formed along an inner wall of the cover layer 131 that defines the active cavity EM1 in the effective area AA, so the second electrode EL2 is spaced apart from the second insulating layer 127. Meanwhile, the second electrode EL2 directly contacts the second insulating layer 127 in the non-effective area NAA.

The second electrode EL2 is connected to a common voltage line (not shown) in the non-effective area NAA. The second electrode EL2 receives a common voltage from the common voltage line.

The first and second electrodes EL1 and EL2 are formed of a transparent conductive material or a non-transparent conductive material, for example, a metal material. That is, the material of the first and second electrodes EL1 and EL2 is determined depending on an operation mode of the display apparatus. For instance, in a case that the display panel 100 is employed to a transmissive-type display apparatus in which a backlight unit is disposed under the base substrate 110, the first and second electrodes EL1 and EL2 may be formed of a transparent conductive material. In a case that the display panel 100 is employed to a reflective type display apparatus that does not require a separate light source, the first electrode EL1 is formed of the non-transparent conductive material that reflects the light and the second electrode EL2 is formed of the transparent conductive material. The transparent conductive material includes a transparent conductive oxide, such as indium tin oxide (ITO), indium zinc oxide (IZO), indium tin zinc oxide (ITZO), etc. The non-transparent conductive material includes the metal material, such as nickel, chromium, molybdenum, aluminum, titanium, copper, tungsten, or alloys thereof. The other elements may be formed of the transparent or non-transparent material according to the operation mode of the display apparatus.

The liquid crystal layer LC is provided into the active cavity EM1 through the inlets. According to the present exemplary embodiment, the liquid crystal layer LC is disposed between the first electrode EL1 and the second electrode EL2 facing the first electrode EL1 and controlled by the electric field generated between the first and second electrodes EL1 and EL2 to display the image.

The liquid crystal layer LC includes the liquid crystal molecules having an optical anisotropy. The liquid crystal molecules are driven by the electric field to transmit or block the light.

The alignment layer 133 is disposed between the first electrode EL1 and the liquid crystal layer LC and between the second electrode EL2 and the liquid crystal layer LC. The alignment layer 133 is used to initially align the liquid crystal molecules of the liquid crystal layer LC and includes an organic polymer, such as polyimide and/or polyamic acid.

Meanwhile, an inorganic insulating layer (not shown) may be further disposed between the liquid crystal layer LC and the second electrode EL2 and/or between the second electrode EL2 and the cover layer 131. The inorganic insulating layer includes silicon nitride or silicon oxide. The inorganic insulating layer supports the cover layer 131 to stably support the active cavity EM1.

A sealant layer 140 is disposed on the cover layer 131. The sealant layer 140 is disposed in the effective area AA and the non-effective area NAA. The sealant layer 140 seals the openings at both end portions of the active cavity EM1 in the non-effective area NAA, and thus, the active cavity EM1 may be sealed. The sealant layer 140 may include an organic polymer of poly(p-xylene) polymer, for example, parylene.

Although not shown in figures, first and second polarizing plates are respectively disposed on both surfaces, for example, upper and lower surfaces, of the display panel 100. A first quarter-wavelength plate is further disposed between the display panel 100 and the first polarizing plate and between a second quarter-wavelength plate is further disposed between the display panel 100 and the second polarizing plate. As an example, the first polarizing plate has a polarizing axis vertically crossing a polarizing axis of the second polarizing plate. The first quarter-wavelength plate has a long axis vertically crossing a long axis of the second quarter-wavelength plate.

The liquid crystal layer LC having the above-mentioned structure is driven by an electrically controlled birefringence (ECB) mode in which the liquid crystal molecules are positive type liquid crystal molecules. However, a part of the optical member may be omitted or further include additional parts in accordance with the type of the liquid crystal layer LC, for example, a positive type or a negative type, and the driving mode of the display device, for example, an in-plane switching mode, a vertical alignment mode, the ECB mode, etc. The arrangement of the polarizing axis of the first and second polarizing plate and the long axis of the first and second quarter-wavelength plates may be changed according to the type of the liquid crystal layer LC and the driving mode of the display device.

Figure 4:
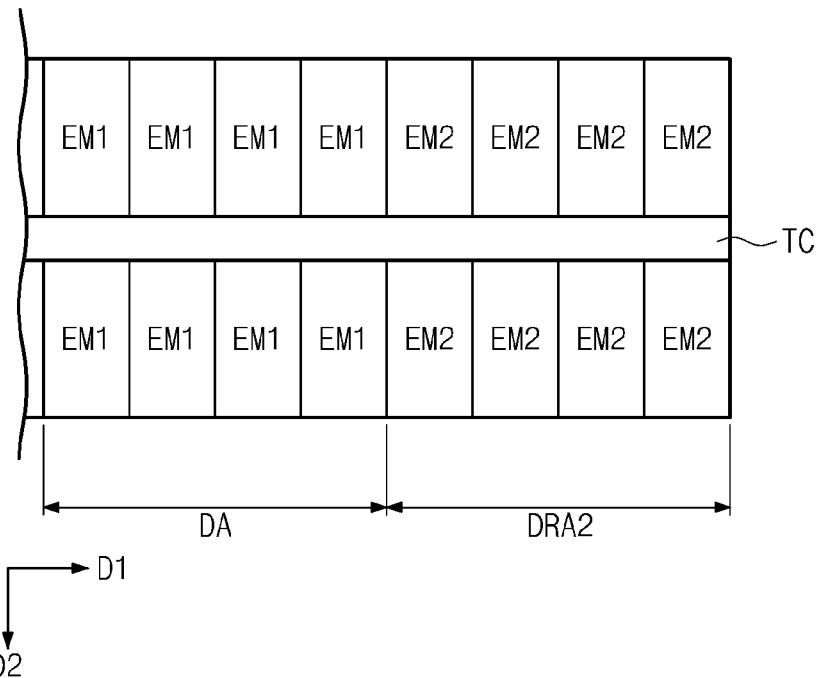
FIG. 4 is a partially enlarged view of a portion A1 of FIG. 1 according to an exemplary embodiment of the present disclosure.

FIG. 4 is a partially enlarged view of a portion A1 of FIG. 1 according to an exemplary embodiment of the present disclosure. Referring to FIG. 4, the active cavity EM1 has the rectangular shape extended in the second direction D2 when viewed in a plan view. One active cavity EM1 is disposed in one pixel. If the pixels PX were arranged on the base substrate 110 in the matrix form, the active cavities EM1 would be arranged in the matrix form. FIG. 4 shows the active cavities EM1 arranged in two pixel rows. In one pixel row, plural active cavities EM1 are disposed and arranged in the first direction D1. In FIG. 4, the active cavities EM1 are arranged to be adjacent to each other in the first direction D1, but substantially the active cavities EM1 are arranged to be spaced apart from each other at a predetermined distance. Although not shown in figures, a barrier wall may be disposed between the active cavities EM1. The barrier wall may be formed by the sealant layer 140 shown in FIG. 3C.

As shown in FIG. 4, the active cavities EM1 are disposed in the display area DA. One or more drain cavities EM2 are formed on at least one end portion of both end portions of each pixel row. That is, the second drain area DRA2 is disposed at the side of the display area DA and four drain cavities EM2 are disposed in the second drain area DRA2 in each pixel row, but the number of the drain cavities EM2 disposed at the end portion of each pixel row should not be limited to four. Each drain cavity EM2 has the tunnel shape as the active cavity EM1. In the present exemplary embodiment, a width of the drain cavity EM2 in the first direction D1 may be equal to a width of the active cavity EM1 in the first direction D1, and a length of the drain cavity EM2 in the second direction D2 may be equal to a length of the active cavity EM1 in the second direction D2.

The pixel rows are arranged in the second direction D2 and spaced apart from each other by a predetermined distance while interposing a trench TC extended in the first direction D1. The trench TC1 has a groove shape between the pixel rows and is connected to the inlets of the active cavity EM1 and the drain cavity EM2 in the display area AA.

When the liquid crystal is formed in the trench TC, the liquid crystal may move into the active cavity EM1 through the inlet of the active cavity EM1 due to a capillary force. Here, an inkjet method may be used to form the liquid crystal to the trench TC.

As an example, the drain cavity EM2 has the capillary force lower than that of the active cavity EM1. Accordingly, the liquid crystal formed in the trench TC preferentially moves to the active cavity EM1. When the liquid crystal remains after the active cavity EM1 is filled with the liquid crystal, the remaining liquid crystal moves into the drain cavity EM2 through the inlets of the drain cavity EM2. That is, the drain cavity EM2 absorbs the liquid crystal that remains after the liquid crystal is injected into the active cavity EM1. As described above, when the capillary force of the drain cavity EM2 is lower than that of the active cavity EM1, the drain cavity EM2 does not disturb the liquid crystal flowing into the active cavity EM1. That is, although the liquid crystal does not remain in the trench TC after the active cavity EM1 is filled with the liquid crystal, the drain cavity EM2 does not bring the liquid crystal filled in the active cavity EM1.

In addition, the drain cavity EM2 has the capillary force higher than that of the trench TC. Thus, the liquid crystal remaining after the liquid crystal is injected into the active cavity EM1 may move into the drain cavity EM2 without remaining in the trench TC.

FIG. 4 shows the structure that the drain cavities EM2 are formed in the second drain area DRA2, but the drain cavities EM2 may be provided in the first drain area DRA1 (refer to FIG. 1). As described above, when the drain cavities EM2 are formed at the both end portions of the pixel row, the liquid crystal may be prevented from remaining in the trench TC and from being perceived as stains after the liquid crystal remaining in the trench TC moves along the cover layer 131 (refer to FIGS. 3A to 3C).

Although a carrying capacity of the liquid crystal provided to the trench TC is difficult to be precisely controlled, a margin of the liquid crystal-carrying capacity may be secured when the drain cavities EM2 are formed. Although not shown in figures, the trench TC is covered by the sealant layer 140. Further, although not shown in figures, the drain cavity EM2 may be disposed in a dummy pixel positioned in the second drain area DRA2. The dummy pixel has the same structure and elements as those of the pixel PX disposed in the display area AA, however the dummy pixel may be formed by various ways as long as the capillary force of the drain cavity EM2 decreases than the capillary force of the active cavity EM1.

Figure 5:
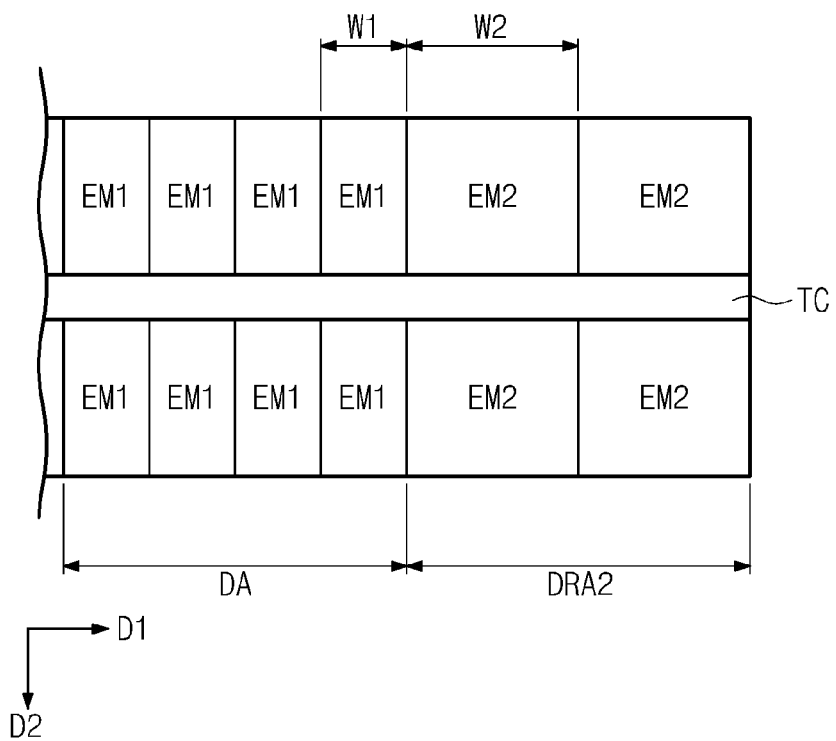
FIG. 5 is a plan view showing a drain cavity according to another exemplary embodiment of the present disclosure.

FIG. 5 is a plan view showing a drain cavity according to another exemplary embodiment of the present disclosure. Referring to FIG. 5, a width W2 of the drain cavity EM2 in the first direction D1 is greater than a width W1 of the active cavity EM 1 in the first direction. As an example, the width W2 of the drain cavity EM2 in the first direction D1 may be three times greater than the width W1 of the active cavity EM1 in the first direction D1.

Figure 6A:
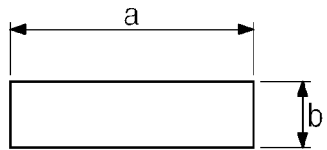
FIG. 6A is a cross-sectional view showing an active cavity.
Figure 6B:
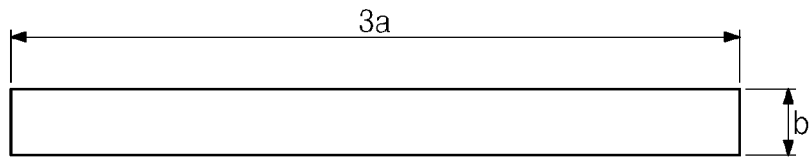
FIG. 6B is a cross-sectional view showing a drain cavity.

FIG. 6A is a cross-sectional view showing an active cavity and FIG. 6B is a cross-sectional view showing a drain cavity. Referring to FIGS. 6A and 6B, the capillary force is proportional to a perimeter of a cross-section of a capillary tube and is proportional to an area of the cross-section of the capillary tube. When the width W1 of the active cavity EM1 in the first direction D1 and a height of the active cavity EM1 are respectively referred to as "a" and "b", the capillary force CF1 of the active cavity EM1 is defined by the following Equation 1.

$$CF1 \propto \frac{(2a+2b)}{ab} \quad \text{Equation 1}$$

In Equation 1, "2a+2b" denotes the perimeter of the cross-section of the active cavity EM1 and "ab" denotes the area of the cross-section.

When the width W2 of the drain cavity EM2 in the first direction D1 is three times greater than the width W1 of the active cavity EM1 in the first direction D1 and a height of the drain cavity EM2 is equal to the height of the active cavity EM1, the capillary force CF2 of the drain cavity EM2 is defined by the following Equation 2.

$$CF2 \propto \frac{(6a+6b)}{3ab} \quad \text{Equation 2}$$

In Equation 2, "6a+2b" denotes the perimeter of the cross-section of the drain cavity EM2 and "3ab" denotes the area of the cross-section of the drain cavity EM2.

As represented by Equations 1 and 2, when the width W2 of the drain cavity EM2 increases greater than the width W1 of the active cavity EM1 while the height is fixed, the capillary force CF2 of the drain cavity EM2 is more reduced than the capillary force CF1 of the active cavity EM 1.

Thus, the width W2 of the drain cavity EM2 may be controlled in a range in which the capillary force CF2 of the drain cavity EM2 is smaller than the capillary force CF1 of the active cavity EM1 and greater than the capillary force of the trench TC.

In FIGS. 6A and 6B, the active cavity EM1 and the drain cavity EM2 have the rectangular shape in the cross-section, but the shape of the active cavity EM1 and the drain cavity EM2 should not be limited to the rectangular shape. That is, the active cavity EM1 and the drain cavity EM2 may have a trapezoid shape, a circular shape, an oval shape, etc. In this case, the capillary force CF2 of the drain cavity EM2 may be controlled by adjusting a width or a diameter of the drain cavity EM2.

Figure 7A:
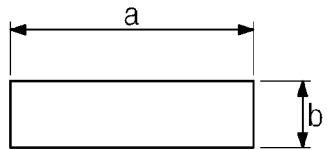
FIG. 7A is a cross-sectional view showing an active cavity.
Figure 7B:
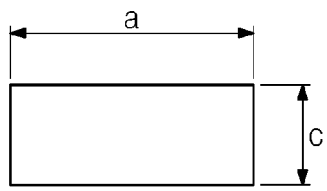
FIG. 7B is a cross-sectional view showing a drain cavity.

FIG. 7A is a cross-sectional view showing an active cavity and FIG. 7B is a cross-sectional view showing a drain cavity. Referring to FIGS. 7A and 7B, the capillary force is proportional to the perimeter of the cross-section of the capillary tube and is proportional to the area of the cross-section of the capillary tube. When the width W1 of the active cavity EM1 in the first direction D1 and the height of the active cavity EM1 are respectively referred to as "a" and "b", the capillary force CF1 of the active cavity EM1 is defined by the above-mentioned Equation 1.

When the width W2 of the drain cavity EM2 in the first direction D1 is equal to the width W1 of the active cavity EM 1 in the first direction D1 and the height of the drain cavity EM2 is higher and the height of the active cavity EM1, the capillary force CF2 of the drain cavity EM2 is defined by the following Equation 3.

$$CF2 \propto \frac{(6a+2c)}{3ac} \quad \text{Equation 3}$$

$$(c > b)$$

In Equation 3, "6a+2c" denotes the perimeter of the cross-section of the drain cavity EM2 and "3ac" denotes the area of the cross-section of the drain cavity EM2.

As represented by Equations 1 and 3, when the height c of the drain cavity EM2 increases greater than the height b of the active cavity EM1 while the widths W1 and W2 is fixed to "a", the capillary force CF2 of the drain cavity EM2 is more reduced than the capillary force CF1 of the active cavity EM1.

Thus, the height of the drain cavity EM2 may be controlled in a range in which the capillary force CF2 of the drain cavity EM2 is smaller than the capillary force CF 1 of the active cavity EM1 and greater than the capillary force of the trench TC.

In FIGS. 7A and 7B, the active cavity EM1 and the drain cavity EM2 have the rectangular shape in the cross-section, but the shape of the active cavity EM1 and the drain cavity EM2 should not be limited to the rectangular shape. That is, the active cavity EM1 and the drain cavity EM2 may have a trapezoid shape, a circular shape, an oval shape, etc. In this case, the capillary force CF2 of the drain cavity EM2 may be controlled by adjusting a width or a diameter of the drain cavity EM2.

FIG. 8 is a cross-sectional view showing a drain cavity according to an exemplary embodiment of the present disclosure. Referring to FIG. 8, the pixel having the active cavity EM1 is formed in the display area DA and the dummy pixel having the drain cavity EM2 is formed in the second drain area DRA2. Since the structure of the pixel having the active cavity EM1 is the same as the structure as shown in FIG. 3B, detailed description of the pixel will be omitted. Meanwhile, the dummy pixel does not include the color filter 123, which differs from the pixel disposed in the display area DA. That is, the color filter 123 is omitted in the dummy pixel, and thus, the height h2 of the drain cavity EM2 is increased.

In detail, the height h2 of the drain cavity EM2 may be equal to a sum of a height h1 of the active cavity EM1 and a height h3 of the color filter 123. As another example, the height h2 of the drain cavity EM2 is greater than the height h1 of the active cavity EM1 and smaller than the sum of the height h1 of the active cavity EM1 and the height h3 of the color filter 123. As described above, when the color filter 123 is omitted in the dummy pixel, the height h2 of the drain cavity EM2 may be more increased than the height h1 of the active cavity EM1. As a result, the capillary force of the drain cavity EM2 may be set lower than the capillary force of the active cavity EM1.

In FIG. 8, the height h2 of the drain cavity EM2 is increased by omitting the color filter 123 in the dummy pixel, but it should not be limited thereto or thereby.

Figure 9:
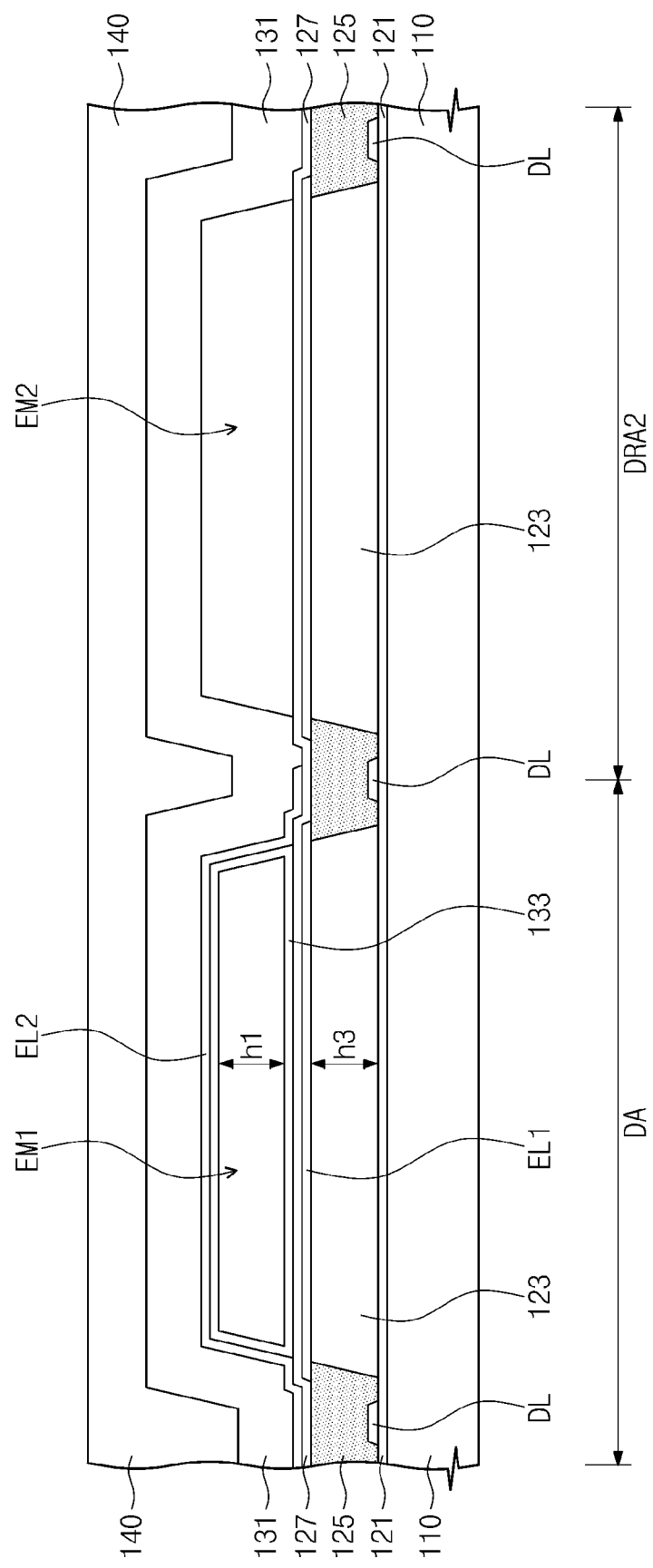
FIG. 9 is a cross-sectional view showing a drain cavity according to another exemplary embodiment of the present disclosure.

FIG. 9 is a cross-sectional view showing a drain cavity according to another exemplary embodiment of the present disclosure. Referring to FIG. 9, the alignment layer 133 is disposed on the inner wall of the active cavity EM1. The second electrode EL2 is interposed between the alignment layer 133 and the cover layer 131. However, the alignment layer 133 may not be formed on the inner wall of the drain cavity EM2 and the second electrode EL2 may not be formed between the drain cavity EM2 and the cover layer 131. Accordingly, the drain cavity EM2 directly contacts the cover layer 131 in the present exemplary embodiment. The alignment layer 133 is formed of the organic polymer, such as polyimide and/or polyamic acid. The cover layer 131 is formed of a material having a surface tension lower than that of the alignment layer 133. For instance, the cover layer 131 is formed of silicon nitride (SiNx) and the silicon nitride has the surface tension lower than that of polyimide.

The capillary force is proportional to a surface tension of a layer that defines the capillary tube, for example, an inner wall of the capillary tube. Therefore, when the surface tension of the layer that defines the inner wall of the drain cavity EM2, for example, the cover layer 131, is lower than the surface tension of the layer that defines the inner wall of the active cavity EM1, for example, the alignment layer 133, the capillary force of the drain cavity EM2 decreases than the capillary force of the active cavity EM1. In this case, the width of the drain cavity EM2 is equal to or greater than the width of the active cavity EM1 and the height of the drain cavity EM2 is equal to or greater than the height of the active cavity EM1.

The capillary force of the drain cavity EM2 may decrease lower than the capillary force of the active cavity EM1 using various ways.

Figure 10:
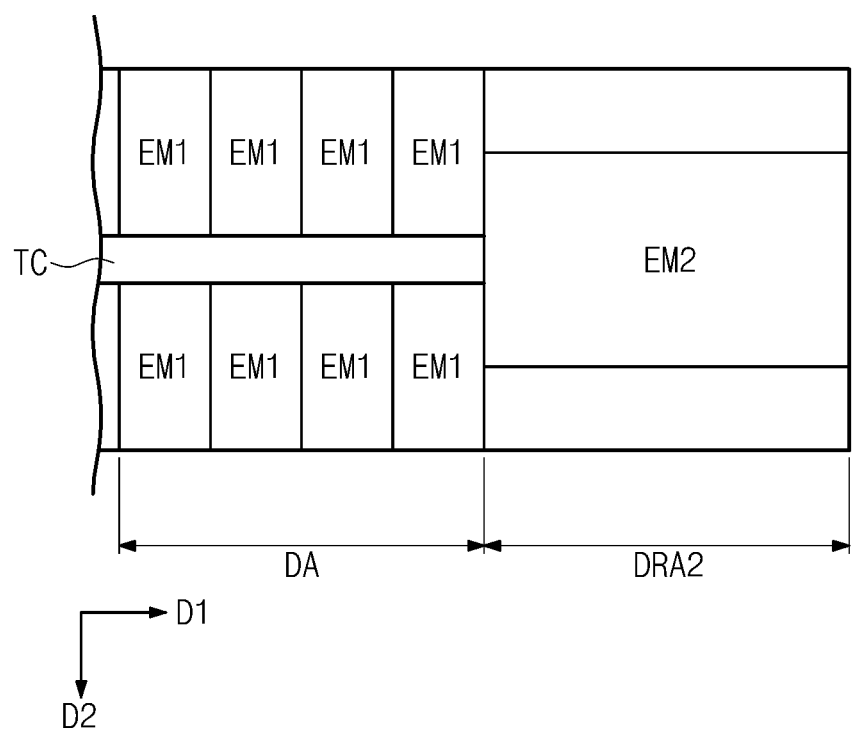
FIG. 10 is a plan view showing a drain cavity according to another exemplary embodiment of the present disclosure.

FIG. 10 is a plan view showing a drain cavity according to another exemplary embodiment of the present disclosure. Referring to FIG. 10, one drain cavity EM2 is disposed in the second drain area DRA2 to overlap with two pixel rows and an inlet is formed at one side portion of the drain cavity EM2, which is connected to the trench TC.

Besides, the shape and structure of the drain cavity EM2 may variously vary as long as the capillary force CF2 of the drain cavity EM2 is smaller than the capillary force CF1 of the active cavity EM1. That is, as described above, the height, width, and surface tension of the drain cavity EM2 may be set different from those of the active cavity EM1.

Figure 11:
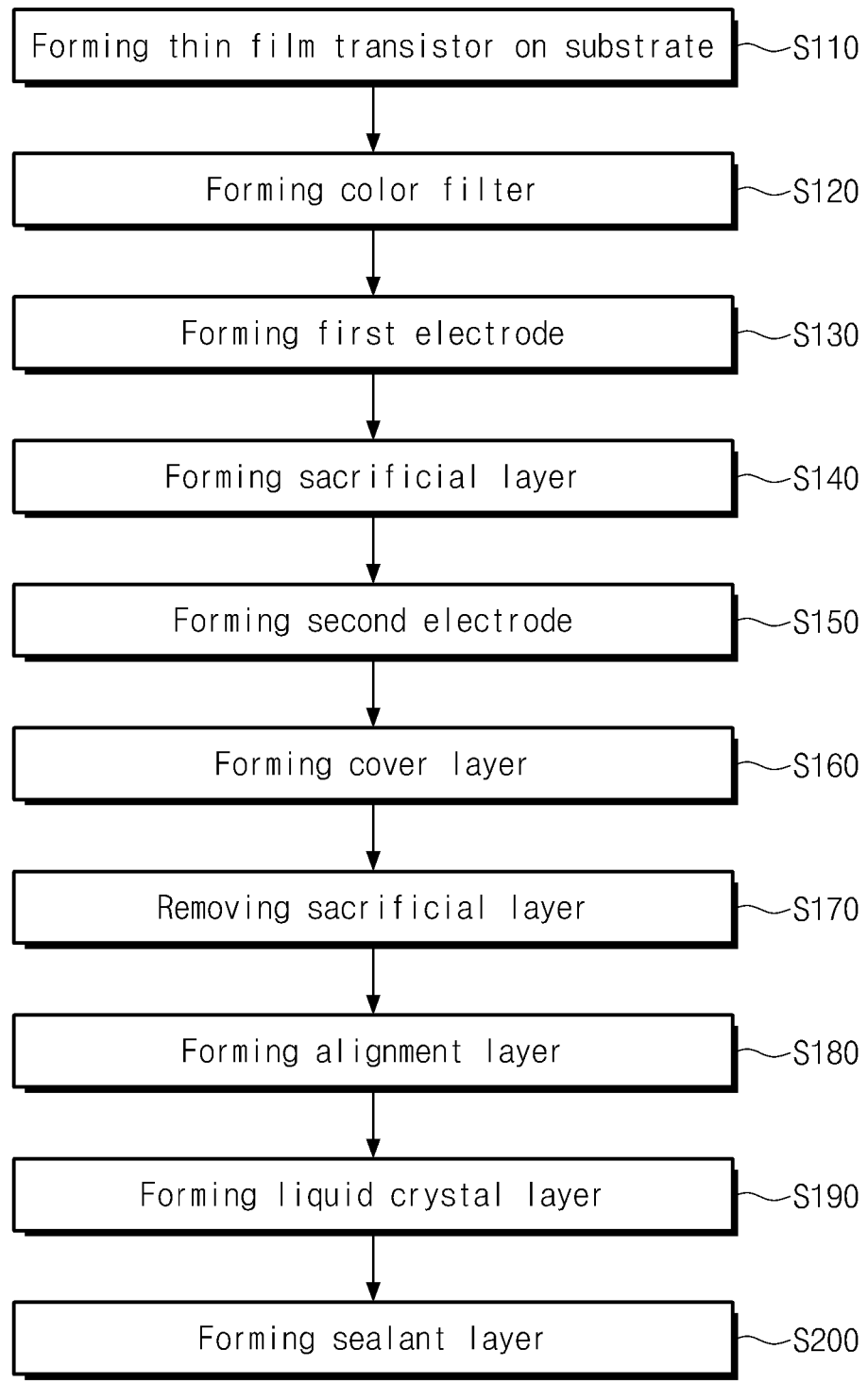
FIG. 11 is a flowchart showing a method of manufacturing a display panel according to an exemplary embodiment of the present disclosure.

FIG. 11 is a flowchart showing a method of manufacturing a display panel according to an exemplary embodiment of the present disclosure. Referring to FIG. 11, the thin film transistor TFT and the color filter 123 are formed on the base substrate 110 (S110 and S120). Then, the first electrode EL1, a sacrificial layer, the second electrode EL2, and the cover layer 131 are sequentially formed on the color filter 123 (S130, S140, S150, and S160), and the sacrificial layer is removed (S170). After that, the alignment layer 133 is formed (S180), the liquid crystal layer LC is formed (S190), and the sealant layer 140 is formed to seal the liquid crystal layer LC (S200).

FIGS. 12A to 12G are cross-sectional views showing the method of manufacturing the display panel. In the present exemplary embodiment, detailed descriptions of the processes before forming the sacrificial layer 130 will be omitted since the processes of forming the thin film transistor TFT and the color filter 123 on the base substrate 110 are similar to conventional processes.

Figure 12A:
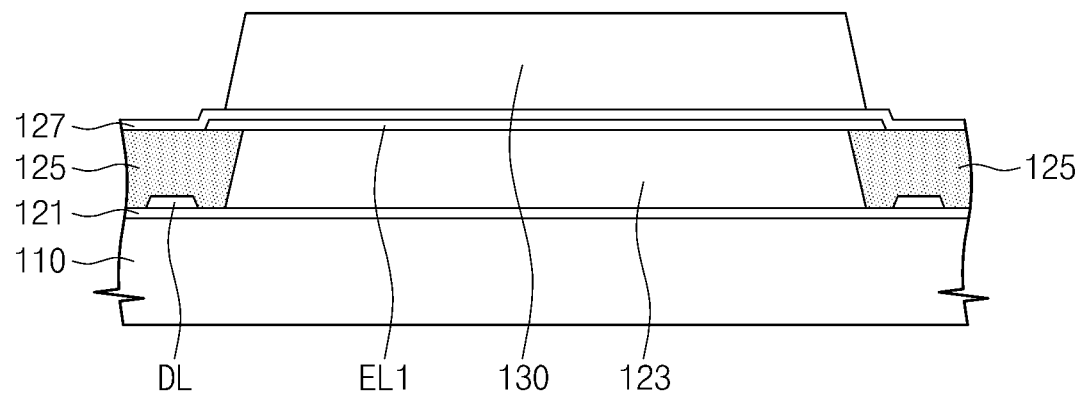
FIG. 12A is a cross-sectional view illustrating a display panel during a manufacturing step of a method of manufacturing the display panel.

Referring to FIG. 12A, the sacrificial layer 130 is formed on the second insulating layer 127 (S140). The sacrificial layer 130 is used to form the active cavity EM1 and the drain cavity EM2 after being removed, and thus, the sacrificial layer 130 is formed to have widths and heights corresponding to widths and heights of the active cavity EM1 and the drain cavity EM2.

Figure 12B:
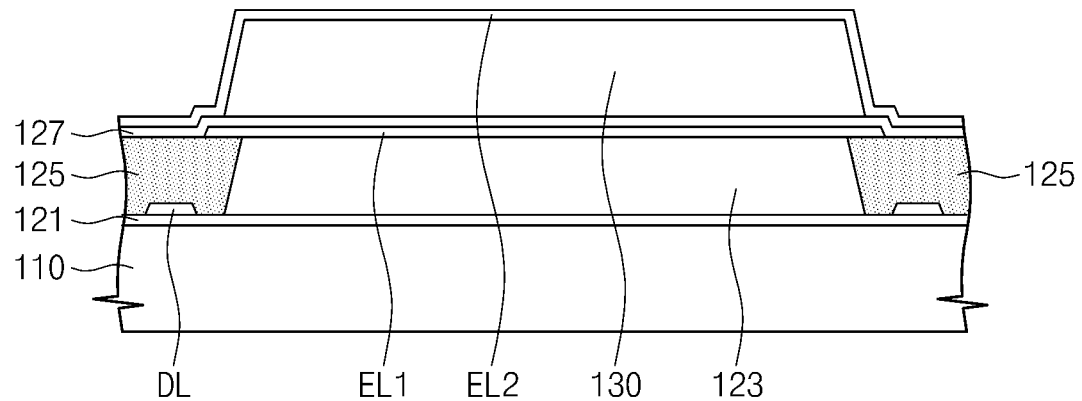
FIG. 12B is a cross-sectional view showing another manufacturing step during the manufacture of the display panel of FIG. 12A.

Referring to FIG. 12B, the second electrode EL2 is formed on the sacrificial layer 130 (S150). The second electrode EL2 is formed by forming a conductive layer on the sacrificial layer 130 and patterning the conductive layer using a photolithography process.

Figure 12C:
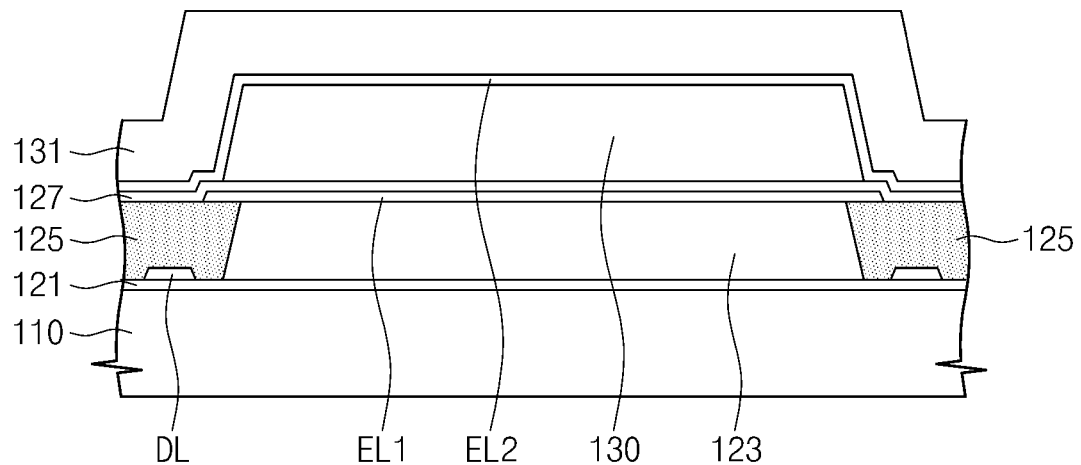
FIG. 12C is a cross-sectional view showing another manufacturing step during the manufacture of the display panel of FIG. 12A.

Referring to FIG. 12C, the cover layer 131 is formed on the base substrate 110 on which the second electrode EL2 is formed (S160). The cover layer 131 is extended in the first direction D1 (refer to FIG. 4) and covers the second electrode EL2. Here, the cover layer 131 is removed from between the pixel rows to form the trench TC (refer to FIG. 4).

Figure 12D:
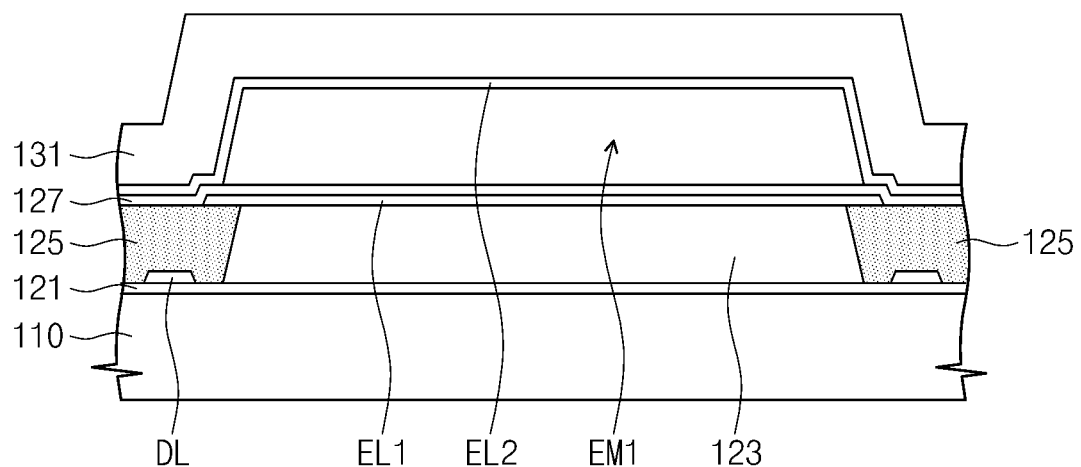
FIG. 12D is a cross-sectional view showing another manufacturing step during the manufacture of the display panel of FIG. 12A.

Referring to FIG. 12D, the sacrificial layer 130 is removed by a dry etch process or a wet etch process to form the active cavity EM1 and the drain cavity EM2 (S170). The dry etch process is performed using plasma and the wet etch process is performed by using various etchants according to the material of the sacrificial layer 130.

Figure 12E:
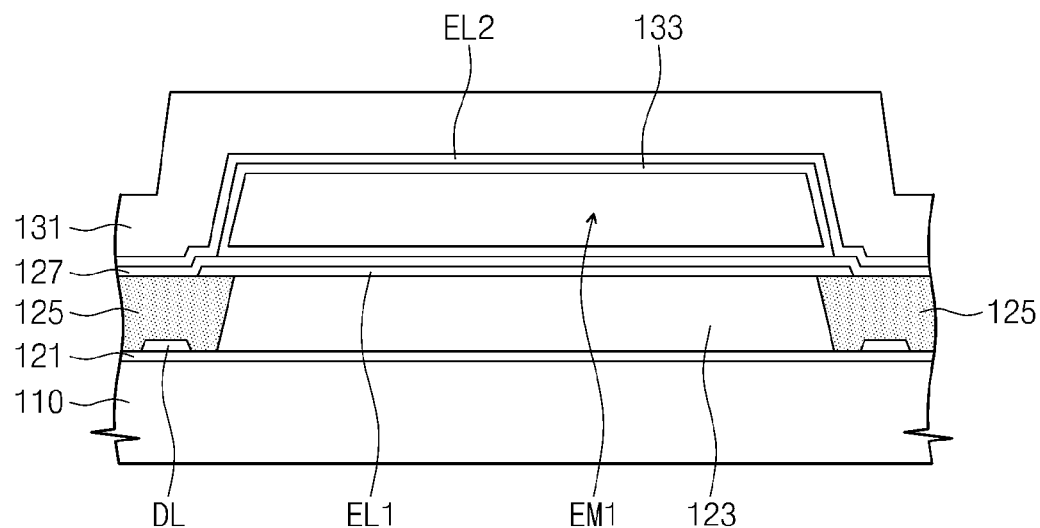
FIG. 12E is a cross-sectional view showing another manufacturing step during the manufacture of the display panel of FIG. 12A.

Referring to FIG. 12E, the alignment layer 133 is formed in the active cavity EM1 (S180). To form the alignment layer 133, an alignment solution containing an alignment material, for example, the organic polymer of polyimide or polyamic acid, and a solvent is provided in the active cavity EM1. Then, the solvent is removed from the alignment solution by lowering pressure or applying heat to the alignment solution.

Figure 12F:
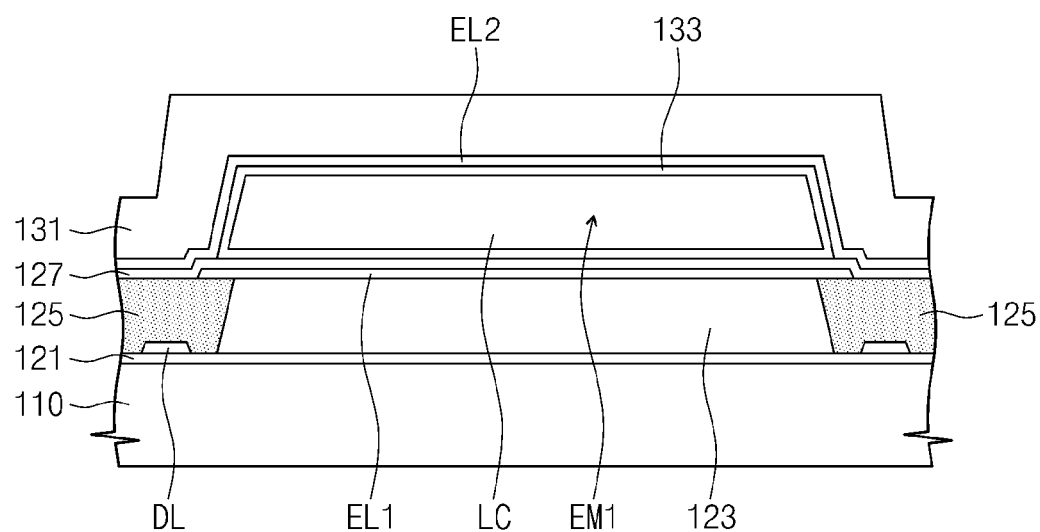
FIG. 12F is a cross-sectional view showing another manufacturing step during the manufacture of the display panel of FIG. 12A.

Referring to FIG. 12F, the liquid crystal layer LC is formed in the active cavity EM1 (S190). The liquid crystal is formed in the trench TC (refer to FIG. 4) in a fluid state obtained by melting a liquid crystal material in solvent and moves into the active cavity EM1 by a capillary phenomenon. The liquid crystal may be formed in the trench TC using a micropipette. The liquid crystal formed in the trench TC moves into the active cavity EM1 by the capillary phenomenon to form the liquid crystal layer LC. After the active cavity EM1 is filled with the liquid crystal, the liquid crystal that remains in the trench TC is absorbed into the drain cavity EM2. Thus, the liquid crystal may be prevented from remaining in the trench TC.

Figure 12G:
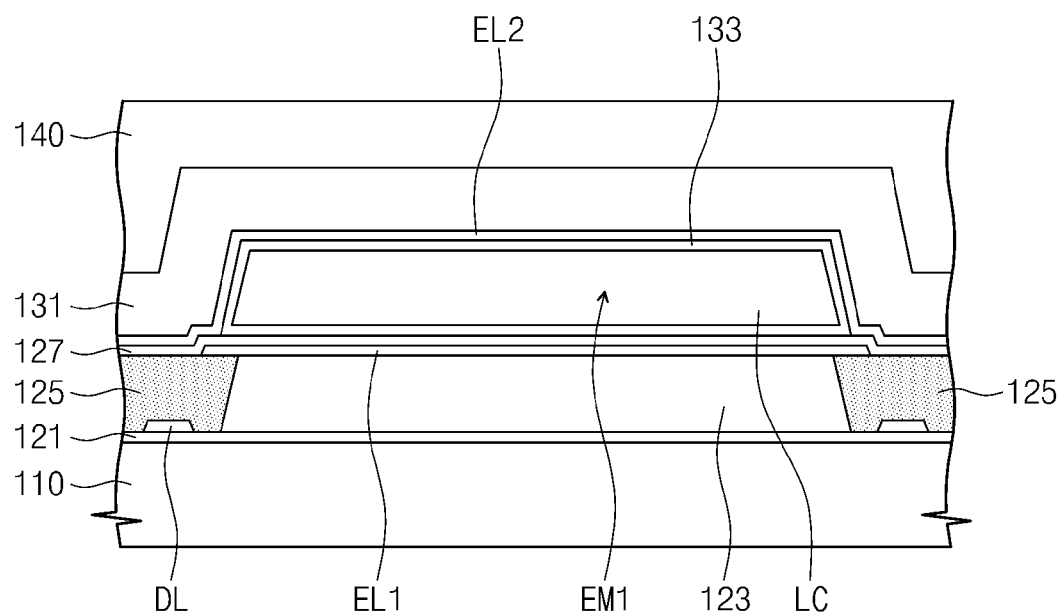
FIG. 12G is a cross-sectional view showing another manufacturing step during the manufacture of the display panel of FIG. 12A.

Referring to FIG. 12G, the sealant layer 140 is formed to seal the inlets of the active cavity EM1 and the drain cavity EM2 (S190). The sealant layer 140 may be formed of the organic polymer, but it should not be limited to the organic polymer as long as the sealant layer 140 seals the inlets of the active cavity EM1 and the drain cavity EM2 by a vacuum deposition. In the present exemplary embodiment, the sealant layer 140 may be formed of poly(p-xylene)polymer, for example, parylene.

Although the exemplary embodiments have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a base substrate;
   a plurality of pixel rows each of which includes a plurality of pixels arranged in a two-dimensional array in a first direction and in a second direction; and
   a sealant layer covering the pixel rows and a trench formed between each of the plurality of pixel rows,
   wherein each pixel row comprises a plurality of active cavities formed along the trench and a drain cavity formed on at least one end of the trench, and
   wherein a positive capillary force decreases along the active cavities, the drain cavity, and the trench.

2. The display apparatus of claim 1, wherein the drain cavity has a height greater than the height of each of the active cavities.

3. The display apparatus of claim 2, wherein each of the pixels further comprises a color filter disposed under the active cavities, wherein the color filter is not disposed under the drain cavity, and wherein the height of the drain cavity is smaller than or equal to a sum of the height of the color filter and the height of the active cavities.

4. The display apparatus of claim 2, wherein the drain cavity has a width equal to the width of each of the active cavities.

5. The display apparatus of claim 1, wherein the drain cavity has a width greater than the width of each of the active cavities.

6. The display apparatus of claim 5, wherein the drain cavity has a height equal to the inner height of each of the active cavities.

7. The display apparatus of claim 1, wherein each of the pixels comprises:
   a cover layer defining the plurality of active cavities;
   an electrode layer formed on an inner surface of the cover layer;
   a liquid crystal layer formed in the active cavities; and
   an alignment layer formed between the liquid crystal layer and the electrode layer.

8. The display apparatus of claim 7, wherein the electrode layer and the alignment layer are disposed outside of the drain cavity.

9. The display apparatus of claim 8, wherein the cover layer comprises a material having a surface tension lower than the surface tension of the alignment layer.

10. The display apparatus of claim 9, wherein the cover layer is formed of silicon nitride.

11. The display apparatus of claim 1, wherein the drain cavity is formed at both end portions of each of the pixel rows.

12. The display apparatus of claim 11, wherein the drain cavity includes a plurality of drain cavities in each of the pixel rows, and wherein the plurality of drain cavities are arranged substantially in parallel to the active cavities.

13. The display apparatus of claim 11, wherein the drain cavity is formed to overlap with two pixel rows and an inlet of the drain cavity is connected to the trench provided between the two pixel rows.

14. A method of manufacturing a display apparatus, comprising:
   forming a sacrificial layer on a base substrate in a unit of pixel;
   forming a cover layer on the sacrificial layer in every pixel row;
   etching the sacrificial layer to form an active cavity and a drain cavity;
   providing a liquid crystal to a trench between the cover layer and an adjacent cover layer;
   moving the liquid crystal into the active cavity and the drain cavity using a positive capillary force to form a liquid crystal layer in the active cavity and the drain cavity; and
   forming a sealant layer to seal inlets of the active cavity and the drain cavity, wherein the positive capillary force decreases along the active cavity, the drain cavity, and the trench, and the liquid crystal provided in the trench moves to the drain cavity after being filled in the active cavity by a difference in positive capillary force.

15. The method of claim 14, further comprising:
   forming an electrode layer between the sacrificial layer and the cover layer; and
   forming an alignment layer between the liquid crystal layer and the electrode layer.

16. The method of claim 15, wherein the electrode layer and the alignment layer are formed outside of the drain cavity.

17. The method of claim 16, wherein the cover layer comprises a material having a surface tension lower than the surface tension of the alignment layer.

18. The method of claim 17, wherein the cover layer is formed of silicon nitride.

19. The method of claim 14, further comprising forming a color filter under the sacrificial layer, wherein the color filter is formed along the perimeter of the sacrificial layer and is not formed directly under the drain cavity.

20. The method of claim 19, wherein the drain cavity has a height greater than the height of the active cavity and smaller than or equal to a sum of the height of the color filter and the height of the active cavity.

* * * * *

UNITED STATES PATENT AND TRADEMARK OFFICE
CERTIFICATE OF CORRECTION

PATENT NO. : 9,122,104 B2  
APPLICATION NO. : 14/051041  
DATED : September 1, 2015  
INVENTOR(S) : Junheui Lee Page 1 of 1

It is certified that error appears in the above-identified patent and that said Letters Patent is hereby corrected as shown below:

Specification

In column 4 at line 48 (approx.), After "line" insert --III-III'--.

In column 9 at line 17 (approx.), Change "EM 1" to --EM1--.

In column 9 at lines 46-48 (approx.), Change " $CF2 \propto \frac{(6a+6b)}{3ab}$ " to -- $CF2 \propto \frac{(6a+2b)}{3ab}$ --.

In column 9 at line 57, Change "EM 1." to --EM1.--.

In column 10 at lines 16-17, Change "EM 1" to --EM1--.

In column 10 at line 38, Change "CF 1" to --CF1--.

Signed and Sealed this  
Twenty-first Day of June, 2016

Michelle K. Lee  
*Director of the United States Patent and Trademark Office*